(12) United States Patent
Asi et al.

(10) Patent No.: US 12,374,321 B2
(45) Date of Patent: Jul. 29, 2025

(54) REDUCING BIASES OF GENERATIVE LANGUAGE MODELS

(71) Applicant: Microsoft Technology Licensing, LLC, Redmond, WA (US)

(72) Inventors: Abedelkader Asi, Kfar Bara (IL); Yarin Kuper, Tel-Aviv (IL); Royi Ronen, Tel Aviv (IL); Song Wang, Bellevue, WA (US); Olga Goldenberg, Tel Aviv (IL); Shimrit Rada Bemis, Tel Aviv (IL); Erez Altus, Tel-Aviv (IL); Yi Mao, Redmond, WA (US); Weizhu Chen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 461 days.

(21) Appl. No.: 17/342,490

(22) Filed: Jun. 8, 2021

(65) Prior Publication Data

US 2022/0392434 A1 Dec. 8, 2022

(51) Int. Cl.
*G10L 15/06* (2013.01)
*G06N 20/00* (2019.01)

(52) U.S. Cl.
CPC ............ *G10L 15/063* (2013.01); *G06N 20/00* (2019.01)

(58) Field of Classification Search
CPC .................................................. G10L 15/063
See application file for complete search history.

(56) References Cited

U.S. PATENT DOCUMENTS

| 2003/0191627 A1* | 10/2003 | Au ........................ G06F 40/30 704/9 |
| 2004/0083224 A1* | 4/2004 | Yoshida ................ G06F 16/353 |
| 2018/0300400 A1* | 10/2018 | Paulus ................... G06N 3/044 |
| 2019/0087728 A1* | 3/2019 | Agarwal ................ G06N 3/047 |
| 2019/0294624 A1* | 9/2019 | Miyabe ................. G06F 16/35 |

(Continued)

FOREIGN PATENT DOCUMENTS

CN          111862260 A          10/2020

OTHER PUBLICATIONS

Rownicka, J., Bell, P., & Renals, S. (Dec. 2019). Embeddings for dnn speaker adaptive training. In 2019 IEEE Automatic Speech Recognition and Understanding Workshop (ASRU) (pp. 479-486). IEEE.*

(Continued)

*Primary Examiner* — Bryan S Blankenagel
(74) *Attorney, Agent, or Firm* — Foley IP Law, PLLC

(57) ABSTRACT

The disclosure herein describes reducing training bias in outputs generated by a generative language model. A communication segment associated with a communication is obtained by at least one processor of a generative language model. An output value associated with the communication segment is generated by the generative language model. The output value is mapped to a set of training bias values associated with the generative language model and based on the mapping of the output value to a training bias value of the set of training bias values, an alternative output value is generated. The alternative output value is used in a generated segment output for the communication segment. The accuracy of segment outputs generated by the generative language model is improved through reducing or eliminating its training biases.

20 Claims, 7 Drawing Sheets

(56) References Cited

U.S. PATENT DOCUMENTS

| | | | |
|---|---|---|---|
| 2020/0142917 A1 | 5/2020 | Paulus | |
| 2020/0226216 A1 | 7/2020 | Marin et al. | |
| 2020/0285702 A1* | 9/2020 | Padhi | G06N 3/08 |
| 2020/0311122 A1 | 10/2020 | Ramamurthy et al. | |
| 2020/0372101 A1 | 11/2020 | Bhide et al. | |
| 2021/0043211 A1 | 2/2021 | Leidner et al. | |
| 2021/0303798 A1* | 9/2021 | Duong | H04L 51/02 |
| 2021/0374341 A1* | 12/2021 | Krause | G06F 40/216 |
| 2021/0374361 A1* | 12/2021 | Wick | G06F 40/58 |
| 2022/0050964 A1* | 2/2022 | Wang | G06F 40/205 |
| 2022/0108086 A1* | 4/2022 | Wu | G06F 40/35 |
| 2022/0147713 A1* | 5/2022 | Garimella | G06F 40/56 |
| 2022/0147770 A1* | 5/2022 | Jain | G06F 18/217 |
| 2022/0261535 A1* | 8/2022 | Madaan | G06F 40/279 |
| 2022/0382907 A1* | 12/2022 | Siohan | G06F 21/6254 |
| 2023/0376691 A1* | 11/2023 | Fang | G06F 16/9537 |

OTHER PUBLICATIONS

"International Search Report and Written Opinion Issued in PCT Application No. PCT/US22/028402", Mailed Date: Jul. 19, 2022, 9 Pages.

Baer, et al., "Controlling Machine-Learning Algorithms and their Biases", In Journal of McKinsey Insights, Nov. 10, 2017, 13 Pages.

Grover, et al., "Bias Correction of Learned Generative Models using Likelihood-Free Importance Weighting", In Proceedings of the 33rd Conference on Neural Information Processing Systems, Dec. 8, 2019, 13 Pages.

Joshi, et al., "Dr. Summarize: Global Summarization of Medical Dialogue by Exploiting Local Structures", In Repository of arXiv:2009.08666v1, Sep. 18, 2020, 12 Pages.

Kawthekar, et al., "Evaluating Generative Models for Text Generation", Retrieved From: https://web.archive.org/web/20201225130012/https:/web.stanford.edu/class/archive/cs/cs224n/cs224n.1174/reports/2737434.pdf, Dec. 25, 2020, 8 Pages.

* cited by examiner

REDUCING BIASES OF GENERATIVE LANGUAGE MODELS

BACKGROUND

Customer Relationship Management (CRM) conversations and other related multi-party communications are lucrative targets for analysis. In some domains, drafting of reports and/or summaries of calls and other conversations requires significant time and effort by agents who would otherwise be able to have conversations with more customers or otherwise provide other services. Existing text summarization methods aim to summarize plain and/or single-party text such as news articles, but these solutions fall short when used with such multi-party communications. Accurately and efficiently summarizing multi-party conversations presents a significant challenge.

Additionally, model trained to generate summaries of text are sometimes biased based on uses of words or phrases in the training data that are domain-specific or otherwise not relevant to later use of the model. Such biases may inhibit the accuracy and flexibility of such models. Reducing or eliminating such biases from the output of models represents a significant improvement over existing technology.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for reducing training bias in outputs generated by a generative language model is described. A communication segment associated with a communication is obtained by at least one processor of a generative language model. An output value associated with the communication segment is generated by the generative language model. The output value is mapped to a set of training bias values associated with the generative language model and based on the mapping of the output value to a training bias value of the set of training bias values, an alternative output value is generated. The alternative output value is used in a generated segment output for the communication segment.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
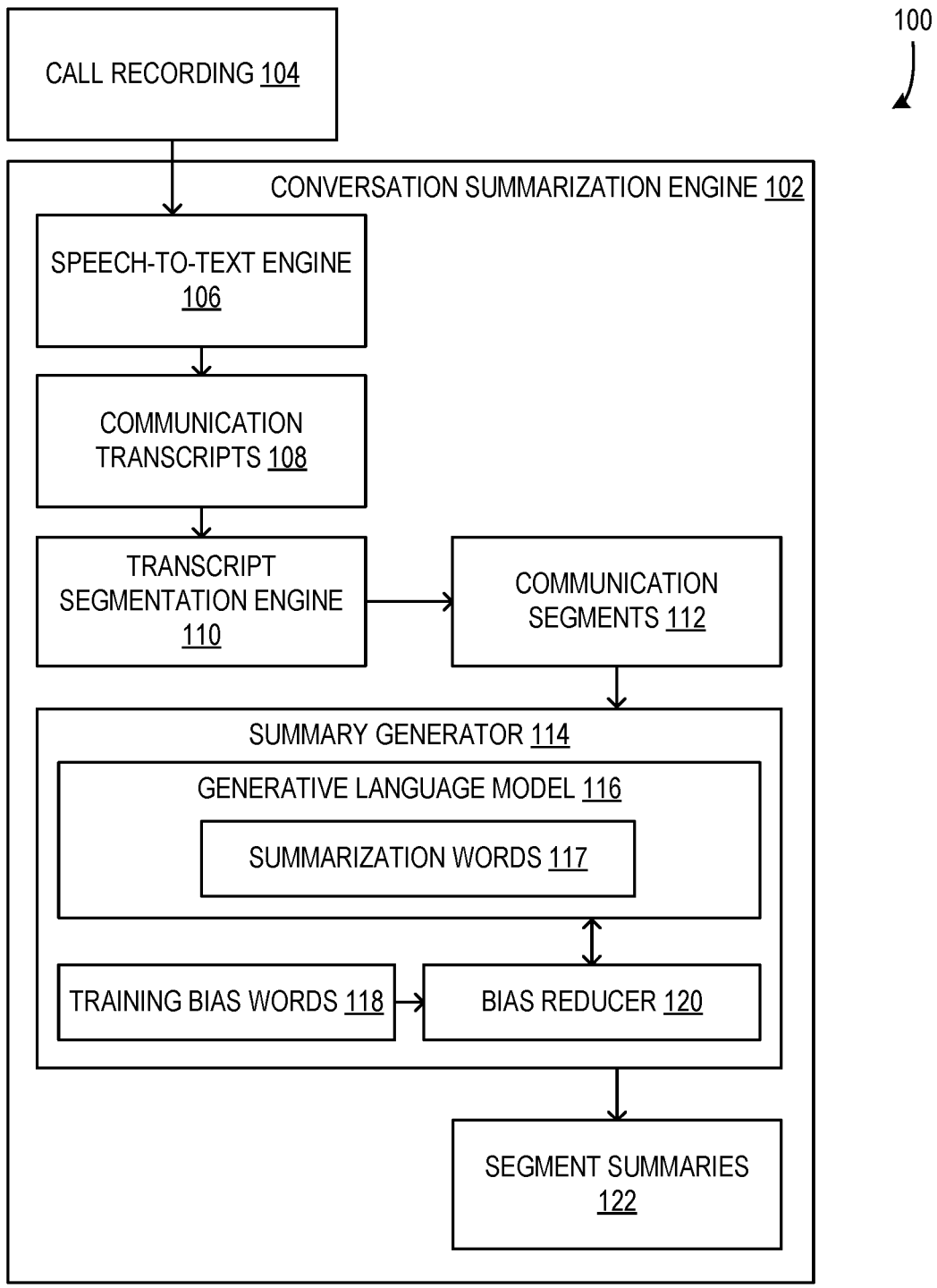
FIG. 1 is a block diagram illustrating a system configured for generating segment summaries from a call recording using a generative language model according to an embodiment.

Aspects of the disclosure provide a computerized method and system for generating summaries using a generative language model (GLM) while reducing the effect of training biases of the model on the generated summaries. In some cases, a GLM is trained using large quantities of data that is specific to a particular domain. For instance, a GLM may be trained using training data associated with conversations in the customer service domain (e.g., conversations or communications between customers and customer service agents). Such training data often includes domain-specific words or phrases that may not be relevant to other domains for which the trained model may be used (e.g., some words or phrases that are customer service-specific may not be relevant to conversations that are in the sales domain, such as sales agents talking to customers and trying to sell them goods or services). The disclosure describes the use of a defined set of training bias words to control and reduce the generation of those words by a trained GLM.

In some examples, the GLM and/or an associated system obtains a communication segment and the GLM generates a summarization word associated with the segment. The generated summarization word is mapped to the defined set of training bias words and, based on the summarization word mapping to or otherwise matching with a training bias word of the set of training bias words, the GLM generates an alternative summarization word. That alternative summarization word is used in a generated segment summary for the communication segment. Such a process may be applied to each summarization word generated by the GLM until a segment summary is completed.

The disclosure operates in an unconventional manner by preventing the trained GLM, which has some bias in favor of the set of training bias words, from generating output with those bias words when generating summaries of transcript text. Thus, domain-specific words (e.g., specific product names or terms of art of the domain) are eliminated from summaries of transcript text of communications that are not associated with that domain. This use of the defined set of training bias words for reducing bias results in a streamlined technique that renders the associated GLM more accurate at generating summaries outside of its training domain and more flexible for use with transcripts associated with a wide variety of different domains. Additionally, or alternatively, while generating a sentence, the GLM may traverse through a tree of potential alternative words and the generated sentence will be corresponding to a path in this tree. Some examples of the disclosure analyze the next potential word when generating a sentence. Once this word maps to or otherwise matches an element in the curated training bias word list, that corresponding path is blocked in the generation tree and the GLM is guided to explore other paths in the tree.

The disclosed GLM, in some examples, is DialogBART, which is an encoder-decoder model adapted from Bidirectional and Auto-Regressive Transformers (BART) type models. DialogBART uses the newly introduced technique to control the text generation process using the training bias words as described herein. Further, DialogBART or other similar disclosed models may be configured with new adaptations to handle conversational text, including analysis of both utterance and speaker relative positions in the transcript, as described herein.

The disclosure reduces the time and effort spent by agents to draft reports or summaries of conversations they have with clients or customers, thereby freeing them to perform their work more efficiently. Further, the use of a defined and curated list of training bias words to guide a GLM in summary generation is a streamlined change that improves the flexibility and accuracy of the GLM to work in domains other than that for which it was trained, reducing the necessity of costs associated with gathering large quantities of domain-specific data and training domain-specific GLMs for each domain to avoid training biases.

FIG. 1 is a block diagram illustrating a system 100 configured for generating segment summaries 122 from a call recording 104 using a GLM 116 according to an embodiment. The system 100 includes a conversation summarization engine 102 that includes hardware, firmware, and/or software that is configured to convert call recordings 104 to communication transcripts 108, divide those transcripts 108 into communication segments 112, and generate segment summaries 122 of those segments 112 using a GLM 116 and an associated bias reducer 120. In some examples, the system 100 is located, stored, and/or executed on a computing device such as a personal computer, server device, tablet computing device or other mobile device, or the like. For instance, a server device may be configured to execute the operations of the modules and components of the conversation summarization engine 102 as described herein.

Alternatively, in other examples, the system 100 is distributed across multiple computing devices, such that components, elements, and/or parts of the system 100 may be located and/or executed on different computing devices that are in communication with each other (e.g., via one or more communication networks, such as internal networks, the Internet, or the like). For instance, the system 100 may be configured to store data associated with operations of the conversation summarization engine 102 on one or more distributes storage devices and/or the system 100 may be configured to execute the operations of the modules and/or components of the conversation summarization engine 102 on one or more distributed computing devices (e.g., the speech-to-text engine 106 and/or the transcript segmentation engine 110 are executed on a first server device and the summary generator 114 is executed on a second server device). In other examples, other arrangements of computing devices may be used to implement the system 100 without departing from the description.

In some examples, the call recordings 104 include audio data associated with a phone call or other speech-based interaction between two or more parties. Such call recordings 104 may include one or more audio data channels and/or time data associated with times at which words or phrases are spoken by the parties and recorded. For instance, the call recording 104 may include a single audio data channel that includes the audio data of all parties of the interaction. Alternatively, the call recording 104 may include a separate audio data channel for each party of the interaction. In other examples, other arrangements may be used in the call recording 104 without departing from the description.

Further, the time data of the call recording 104 may include a time length of the interaction and/or timestamps association with times during the interaction that words or phrases are spoken by the parties. In some examples, such time data may be in the form of a timeline of the interaction and indicators of spoken words or phrases at associated times along the timeline. Such time data may be used to display or otherwise describe the call recording 104 with respect to relative timing of the associated interaction between the parties.

In some examples, the speech-to-text engine 106 includes hardware, firmware, and/or software configured to receive audio data such as the call recording 104 and convert the audio data into text data, such as the communication transcripts 108. The speech-to-text engine 106 may be configured to generate words, phrases, and sentences that reflect the communication represented in the call recording 104. Additionally, or alternatively, the speech-to-text engine 106 may be configured to generate data indicative of aspects of the call recording 104 other than words spoken, such as lengths of pauses between speaking, time data associated with periods when multiple parties are speaking, time data associated with periods when the speech-to-text engine 106 was unable to decipher the words or phrases being spoken, or the like. Further, the speech-to-text engine 106 may be configured to determine the speaking party for each word or phrase in the call recording 104 and include data indicative of this determination in the communication transcripts 108, such as labels for each word or phrase identifying the speaker. Such party identity data may be useful to the summary generator 114 and/or GLM 116 when generating segment summaries 122 as described herein. In other examples, the speech-to-text engine 106 may be configured to generate more or different types of data from the call recording 104 or other audio data without departing from the description herein.

In some examples, the communication transcripts 108 include natural language text data of the language used during a communication or interaction associated with the call recording 104, such as a telephone call, video call, instant messaging chat log, and/or other forms of conversation between two parties. In related examples, single-party communications, such as voice mail, may be analyzed as described herein without departing from the description. As illustrated, the communication transcripts 108 are generated from call recordings 104 by the speech-to-text engine 106. In other examples, the communication transcripts 108 may be generated manually by a transcriptionist that listens to or otherwise observes the associated communications without departing from the description. Additionally, or alternatively, the communication transcripts 108 may include data indicating words and phrases used during the communication and/or other data associated with the communication, such as punctuation used, timing data associated the communication (e.g., when words are said, length of pauses between sentences, or the like).

The transcript segmentation engine 110 includes hardware, firmware, and/or software configured to divide a transcript of a communication, such as communication transcripts 108, into communication segments 112. In some examples, the transcript segmentation engine 110 is configured to divide a transcript 108 into communication segments 110 by identifying approximate coherent thematic portions of the communication (e.g., each segment 112 includes communication data of the communication associated with a single topic and each segment 112 may be associated with a different topic from other segments 112 of the transcript 108). For instance, the transcript segmentation engine 110 may be configured to identify each sentence in the transcript 108 and vectorize the identified sentences (e.g., using Bidirectional Encoder Representations from Transformers (BERT) techniques or the like). The sentence vectors of the transcript 108 may then be split into groups based on similarity (e.g., the groups of sentence vectors may be determined based on maximizing the accumulated weighted cosine similarity by using the textsplit implementation or the like). The resulting communication segments 112 include groups of sentences from the transcript 108 being analyzed that are grouped such that all sentences in a group are related to a particular topic. It should be understood that, in other examples, other techniques may be used to divide communication transcripts 108 into communication segments 112 of sentences grouped by topics without departing from the description herein.

In some examples, the communication segments 112 from the communication transcripts 108 are provided to the summary generator 114, including a generative language model (GLM) 116 (e.g., Generative Pre-Trained Transformer 3 (GPT-3)) and/or the GLM 116 is applied to the communication segments 112. Each communication segment 112 may be processed separately using the GLM 116 as described herein. The GLM 116 includes hardware, firmware, and/or software configured to interpret the language of the communication segments 112 and generate segment summaries 122 associated with the communication segments 112. Additionally, or alternatively, the communication segments 112 may be based on types of communication that differ from the communication transcripts 108 without departing from the description (e.g., communication via a text-based chat application, communication via forum or message board posts, communication between humans and automated communication sources, or the like).

In some examples, the summary generator 114 includes hardware, firmware, and/or software configured to receive communication segments 112 as input and to generate associated segment summaries 122 as output (e.g., for each communication segment 112, at least one segment summary 122 is generated that summarizes the communication occurring in the communication segment 112). The summary generator 114 further includes the GLM 116, the set of training bias words 118 and the bias reducer 120. The summary generator 114 may be configured to prepare or otherwise process the data of the communication segments 112 for provision to the GLM 116. Such processing may include the extraction or determination of embedding data from the text data of the communication segment 112. This is described in greater detail below with respect to FIG. 3.

In some examples, the GLM 116 is trained to receive text data or data associated therewith (e.g., embedding data of text data) and to generate summarization words 117 and/or phrases based on the received data. The training of the GLM 116 may be done using a large quantity of training data. For instance, the GLM 116 may be trained using text data of many communication segments that are associated with summaries of those communication segments. The communication segments are treated as example input and the associated summaries are treated as example output. The GLM 116 is trained to provide summaries that are similar to the training summaries in response to receiving communication segments that are similar to the training communication segments. In some examples, the GLM 116 is trained using deep learning techniques and/or other types of machine learning techniques. However, in other examples, a model like the GLM 116 may be trained using different techniques and used in the system 100 without departing from the description herein.

In some examples, the GLM 116 is a model configured to generate other types of output data and/or values than summarization words 117. For instance, the GLM 116 may be replaced by a model configured to generate numeric values; letters, words, or phrases for purposes other than summarization (e.g., words for classification); output data tuples that include multiple associated output values; or the like. In examples where the GLM 116 is replaced with a model configured to generate output values other than summarization words 117, it should be understood that the bias reduction techniques described herein may be applied to those output values as well. For instance, if the GLM 116 is configured to generate numeric values as output in response to input data, a set of training bias numeric values may be defined, and those values may be used to redirect the GLM 116 when generating output numeric values to reduce bias toward the values of the set. In other examples, the GLM 116 may be trained using other types of input and output data without departing from the description.

In examples where the model of the system 100 is configured to generate output values that may not be summarization words, a communication segment associated with a communication may be obtained by at least one processor of a generative language model. An output value (e.g., a summarization word or other type of output value) associated with the communication segment is generated by the generative language model. The output value is mapped to a set of training bias values (e.g., a set of training bias words or other type of training bias values) associated with the generative language model and based on the mapping of the output value to a training bias value of the set of training bias values, an alternative output value is generated. The alternative output value is used in a generated segment output (e.g., a segment summary or other type of output) for the communication segment.

In some examples, the training of the GLM 116 includes machine learning techniques that use, for instance, a trained regressor such as a random decision forest, a directed acyclic graph, a support vector machine, a convolutional neural network or other neural network, or another trained regressor. It should further be understood that the training of the GLM 116 may make use of training data including training communication segments and associated training segment summaries as training data pairs when applying machine learning techniques and/or algorithms. Millions of training data pairs may be stored in a machine learning data structure (e.g., of the system 100) for use in training the GLM 116.

Additionally, the training data used may be selected to train the GLM 116 to generate summaries that focus on different aspects of the communication based on the identity of the party that is communicating. For instance, the training data may include training segment summaries that summarize a customer's communication by focusing on the issues brought up or questions asked by the customer and training segment summaries that summarize an agent's communication by focusing on the solutions provided by the agent and specific key performance indicators of the agent. As a result, the GLM 116 is trained to generate summaries of customer communication and agent communication with differing main focuses.

In some examples, the set of training bias words 118 are words that are in the training data of the GLM 116 that have been identified as being potential causes of bias in the segment summaries 122 generated by the GLM 116. For instance, if the training data includes language that is biased toward one gender over another, words indicative of that potential gender bias may be included in the training bias words 118. Alternatively, or additionally, words identified as being domain-specific to a domain represented in the training data (e.g., a customer service domain of the training data communication segments) may be included in the set of training bias words 118. For instance, customer service-specific words may include very specific words such as commonly mentioned product names or more general words that tend to specific to the customer service domain, such as "subscription" or the like. If such words occur in the training data with a high enough frequency, they may be added to the set of training bias words 118, enabling the bias reducer 120 to determine when a summarization word generated by the GLM 116 maps to or matches one of the training bias words 118 and to take action to reduce the potential bias (e.g., by instructing the GLM 116 to generate an alternative summarization word).

The set of training bias words 118 may be generated manually by a user who identifies potential biases of the GLM 116. Such biases may be identified through review of the training data of the GLM 116 and/or review of the output segment summaries 122 of the GLM 116. For instance, a user may notice that the training data includes many instances of a particular product name being mentioned that is not relevant to uses of the GLM 116 outside of the customer service domain. As a result, the user may add that product name to the set of training bias words 118. Alternatively, or additionally, the user may review segment summaries 122 from the GLM 116 and identify that an inaccurate word is being used in some of the summaries 122 (e.g., using "subscription" in places when "contract" would make more sense). As a result, the user may add the word "subscription" to the set of training bias words 118 as well. A user may use other methods of review and analysis to manually create the set of training bias words 118 without departing from the description herein.

Further, in some examples, the set of training bias words 118 may be generated automatically. For instance, bias word identification rules may be defined that are then applied to some or all of the training data. Based on the application of the bias word identification rules, the set of training bias words 118 may be generated. For instance, a bias word identification rule may be defined that identifies words that are similar to a particular domain-specific word and that are used frequently in the training data (e.g., words that exceed a defined frequency threshold in the training data, such as words that appear in more than 5% of the training communication segments or associated training segment summaries). Such automatically generated training bias words 118 may also be reviewed by a user and approved or rejected. Other techniques of identifying the training bias words 118 from the training data of the GLM 116 and/or from the output of the GLM 116 may be used without departing from the description.

Figure 2:
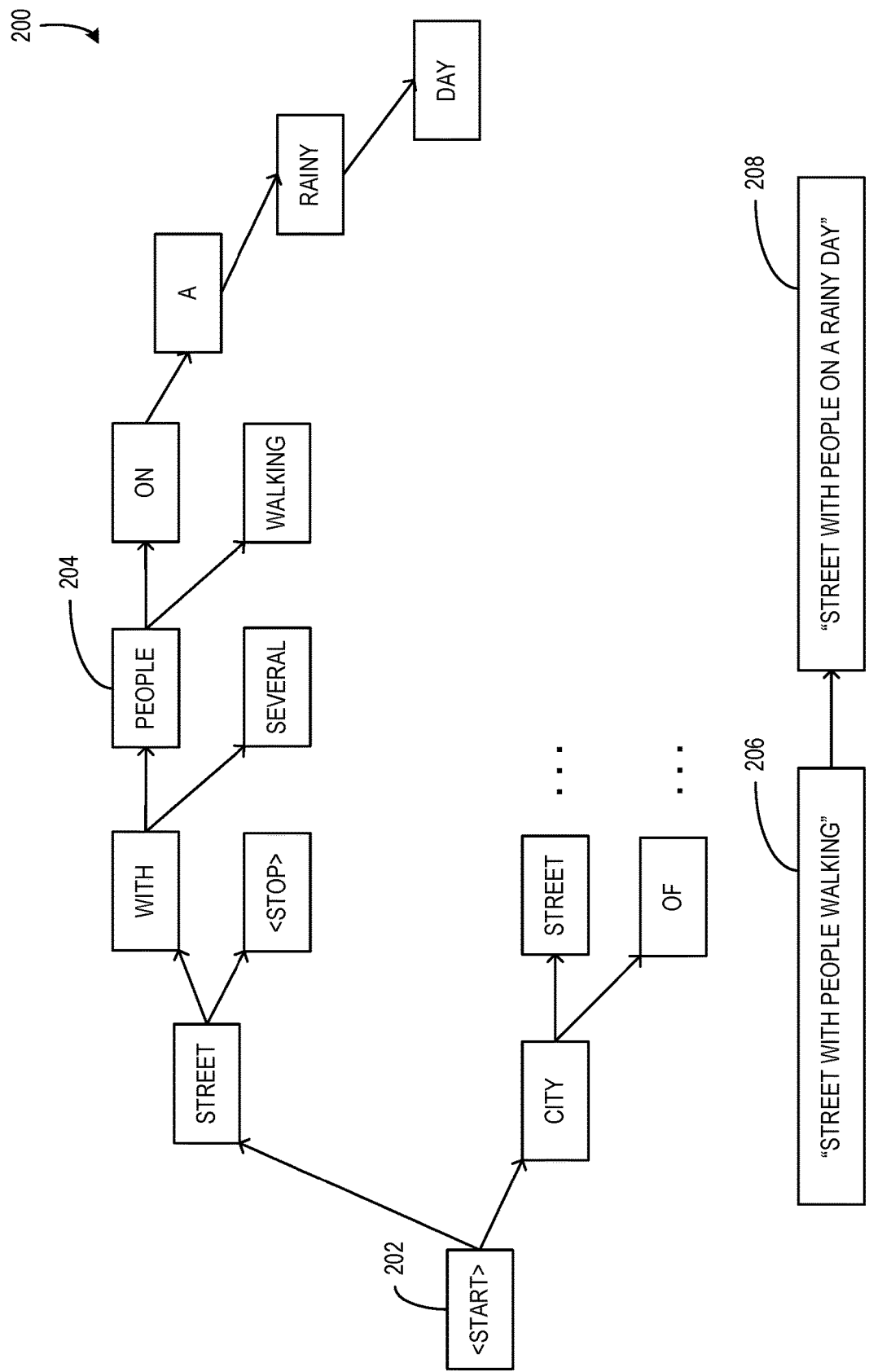
FIG. 2 is a diagram illustrating a branching tree of potential summarization words representing a generative language model generating such summarization words according to an embodiment.

In some examples, the bias reducer 120 includes hardware, firmware, and/or software configured to review summarization words 117 generated by the GLM 116 while the GLM 116 is operating, determine whether those summarization words 117 map to training bias words 118. If a summarization word 117 does map to a training bias word 118, the bias reducer 120 may be configured to instruct the GLM 116 to generate an alternative summarization word 117. In some examples, where the GLM 116 generates summarization words 117 based on branching paths as illustrated in FIG. 2, the training bias words 118 represent points along those branching paths at which the bias reducer 120 is configured to stop the GLM 116 from proceeding and redirect the GLM 116 to use another summarization word 117 if possible. This is described in greater detail below with respect to FIG. 2.

The segment summaries 122 generated by the summary generator 114 include summarization words 117 and/or phrases that summarize associated communication segments 112. In some examples, the segment summaries 122 includes summaries of the associated communication from the perspective of each party to the communication. In examples where the communication is between a first party and a second party, a segment summary 122 may be generated that includes a summary of the communication of the first party and a summary of the communication of the second party. For instance, a communication may include a customer calling a sales agent to ask a question about the status of an order. The associated segment summary 122 may include a customer-based summary describing that the customer has called the agent to ask about the status of the particular order and an agent-based summary describing that the agent provided an update on the status of the order and inquired as to whether the customer had any further questions. In other examples, the segment summaries 122 may include more, fewer, or different structural details without departing from the description (e.g., conversations between more than two parties may have summaries for each of those parties).

FIG. 2 is a diagram illustrating a branching tree 200 of potential summarization words (e.g., word 204) representing a generative language model generating such summarization words according to an embodiment. In some examples, the branching tree 200 is representative of the functionality of a GLM 116 in a system 100 as described herein. The GLM 116 may be configured to generate a series of summarization words based on a communication segment that is currently being analyzed. The GLM 116 may be configured to analyze one or more words or phrases in the communication segment to begin building a segment summary from summarization words starting at a starting point 202 of a branching tree of possible words. The analysis of the words of the communication segment may result in the GLM 116 assigning factors or weights to the next possible words in the tree (e.g., the factors or weights may be assigned based on how the GLM 116 was trained using training data). For instance, the GLM 116 may assign factors or weights to the words "street" and "city", which are next along the branching tree from the start 202. It should be understood that, while many of the illustrated words in the tree branch to only two other words, in other examples, the branching tree may include more, fewer, or different branches to words without departing from a description. For instance, a single word in a branching tree may potentially branch to many more words than two.

As the summarization words 117 are generated by the GLM 116 based on the assigned factors or weights, the GLM 116 may further account for the previously generated summarization words in the segment summary that is currently being generated (e.g., as a result of the structure of the branching tree). So, when the GLM 116 reaches "people" at word 204, it may be more likely to branch to "walking" than "on" based on the content of the communication segment being analyzed and/or based on the already-generated summarization words, "street with people".

In some examples, the GLM 116 branches to generate "walking" to form the segment summary 206, "street with people walking". However, in examples where the word "walking" is included in the training bias words 118, the bias reducer 120 associated with the GLM 116 may map the most recently generated word, "walking", to the matching word in the training bias words 118 and, as a result, the bias reducer 120 may instruct the GLM 116 to generate an alternative summarization word. As illustrated, the GLM 116 may generate the word "on", followed by the words "a rainy day", such that the segment summary becomes segment summary 208, "street with people on a rainy day".

In some examples, upon determining that a generated summarization word 117 matches or maps to a training bias word 118 the bias reducer 120 may be configured to instruct the GLM 116 to generate an alternative summarization word and, upon receiving those instructions, the GLM 116 may be configured to generate the alternative summarization word by selecting the branch with the second highest or largest assigned factor or weight (e.g., "walking" may have a factor of 1.28 while "on" may have a factor of 0.85, which is the second highest, largest, or otherwise most accurate factors). In other examples, the GLM 116 may be configured to generate alternative summarization words in other ways without departing from the description herein.

Figure 3:
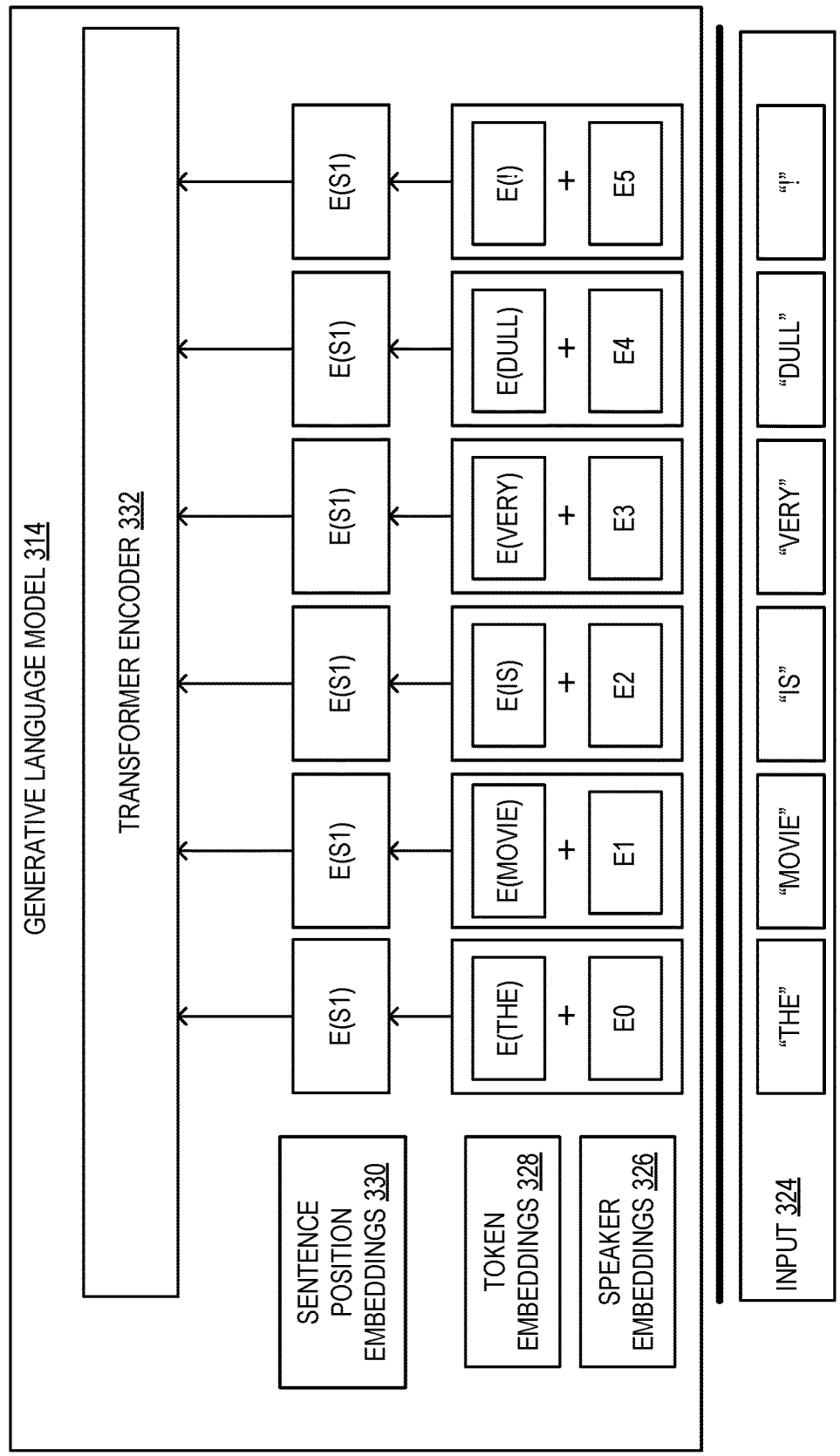
FIG. 3 is a diagram illustrating use of embedding data of input by a generative language model according to an embodiment.

FIG. 3 is a diagram 300 illustrating use of embedding data (e.g., speaker embeddings 326, token embeddings 328, sentence position embeddings 330, and/or other embedding data, such as token position embedding) of input 324 by a GLM 314 according to an embodiment. In some examples, the GLM 314 is part of a system such as system 100 of FIG. 1 as described herein.

The input 324 includes a series of words making the sentence, "The movie is very dull!". Each of the words and the punctuation mark of the input 324 are separated and embedding data is determined separately for each word. The embedding data determined for each word of the input includes speaker embeddings 326, token embeddings 328, and sentence position embeddings 330. In some examples, the embedding data is data that the GLM 314 is configured and trained to extract or determine for words. Embedding data may include a learned representation for text (e.g., learned by the GLM 314 during training) such that words that have similar meanings have similar representations (a representation may be a vector including one or more numerical values). For instance, the token embeddings 328 may include such vectors representative of the meaning of the associated word (e.g., a token embedding 328 for the word "the" includes a vector representative of the word "the" based on the training of the GLM 314).

Alternatively, or additionally, embedding data of a word of the input 324 may include speaker embeddings 326, which include data values that are indicative of the speaker that said the associated word in the conversation, and/or sentence position embeddings 330, which include data values indicative of the sentence in which the word is located relative to the communication segment (e.g., a word may be part of the 4$^{th}$ sentence in the communication segment and the associated sentence position embedding may reflect that 4$^{th}$ sentence position, such as a value of four). In some examples, the GLM 314 is configured to determine and/or extract such embeddings from the communication segment (e.g., by parsing the transcript data with a turn separator, such as a '|' character). Alternatively, or additionally, embedding data, such as the speaker embeddings, may be determined prior to providing the communication segment to the GLM 314 (e.g., speaker embedding data may be determined by the speech-to-text engine 106, the transcript segmentation engine 110, and/or another component of the conversation summarization engine 102).

In some examples, the embedding data of the input 324 is provided as input to a transformer encoder 332 of the GLM 314. The transformer encoder 332 may be configured and/or trained to analyze the embedding data from the input 324 and generate summarization words (e.g., summarization words 117) for use in an associated segment summary as described herein. In some examples, the transformer encoder 332 may also be configured to generate alternative summarization words based on instructions from other portions of an associated system, such as a bias reducer 120 as described herein.

In some examples, the transformer encoder 332 and/or the GLM 314 generally are trained based on the speaker embeddings 326 and the sentence position embeddings 330 such that these embeddings are included as parameters of the GLM (e.g., BART) architecture. Processing such embeddings may be both randomly initialized and learned during training with training transcript data.

For speaker embeddings 326, the GLM 314 may be trained to learn to process embedding vectors corresponding to roles (e.g., three vectors corresponding to an "Agent" role, a "Customer" role, and an "Other" role). During application, when a transcript with expected format is received at the GLM 314, the GLM 314 may parse the transcript data based on a turn separator (e.g., a character such as '|') and will map the speaker of each turn to one of the role vectors and use those vectors during generation of summarization words.

For sentence position embeddings 330, or turn position embeddings, the GLM 314 may be trained to use many different vectors (e.g., up to 150 vectors). In application, when transcript data that includes a turn separator character, the GLM 314 is configured to determine a turn index (e.g., 1, 2, . . . , 150) and apply the corresponding embedding vectors. Such processing may require that the transcript data be formatted to include such turn separator characters (e.g., "Agent: xxx|Customer: yyy|Agent: xxx . . . ").

Figure 4:
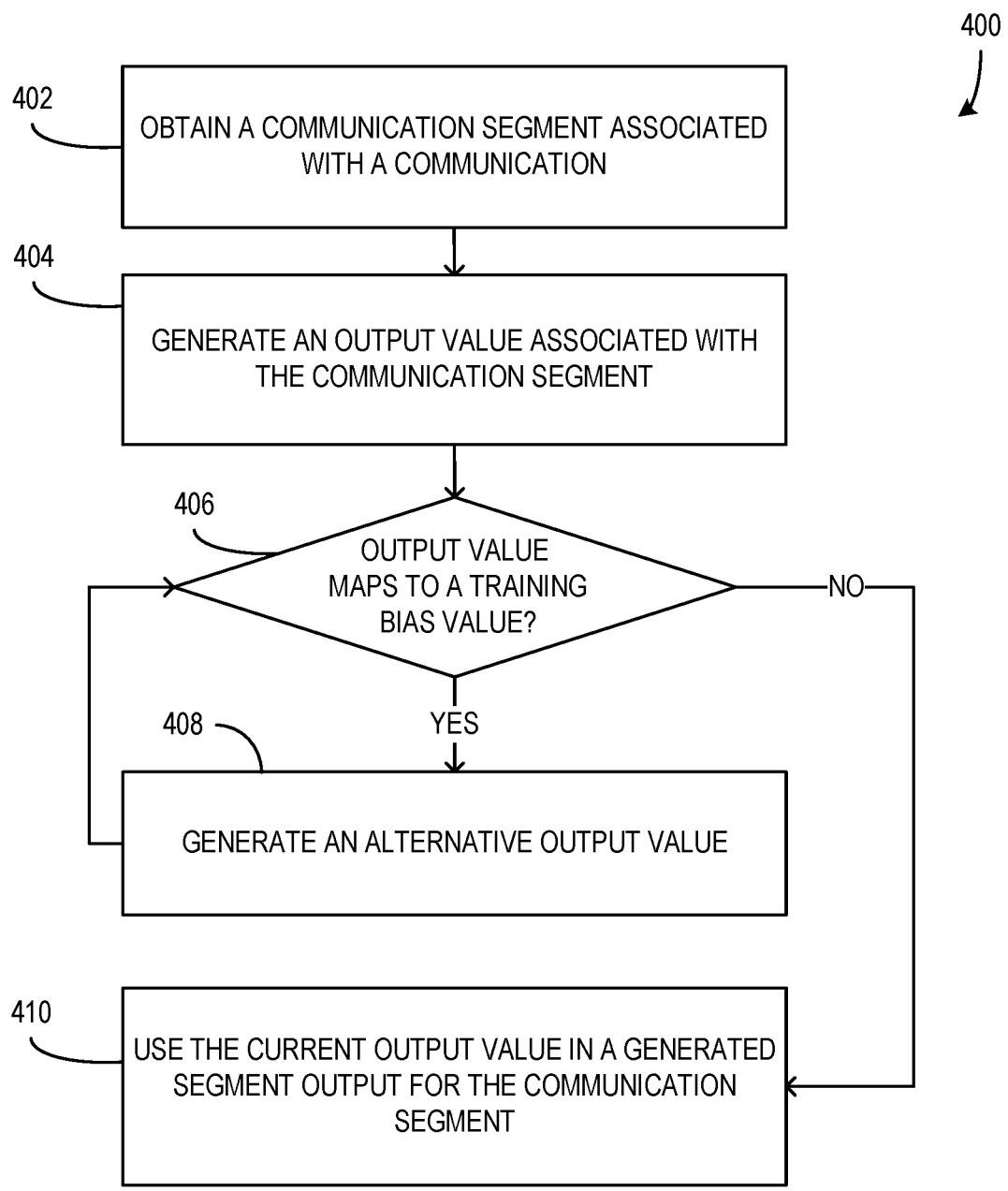
FIG. 4 is a flowchart illustrating a computerized method for generating a segment summary based on a communication segment using a generative language model according to an embodiment.

FIG. 4 is a flowchart illustrating a computerized method 400 for generating a segment output (e.g., segment summaries 122) based on a communication segment (e.g., communication segments 112) using a generative language model (e.g., GLM 116) according to an embodiment. In some examples, the method 400 is executed or otherwise performed by a system such as system 100 of FIG. 1 and/or components thereof, such as GLM 116. At 402, a communication segment associated with a communication is obtained. In some examples, a GLM obtains the communication segment from a plurality of segments that make up a complete communication transcript (e.g., communication transcripts 108) that has been divided into segments by a transcript segmentation engine (e.g., transcript segmentation engine 110). Additionally, or alternatively, the communication transcripts may be obtained by processing audio data of the communication (e.g., a call recording 104) using a speech-to-text engine (e.g., speech-to-text engine 106) as described herein.

At 404, an output value (e.g., summarization words 117) associated with the communication segment is generated. In some examples, the generation of the summarization word or other output value is executed or performed by a GLM. The GLM may be trained to generate output values based on communication segments using deep learning techniques as described herein. For instance, in some examples, the GLM is configured and trained to assign factors or weights to potential output values based on the words and/or phrases of the segment and/or on other output values that have already been generated. The GLM may then generate the output value based on those assigned factors or weights, as described herein with respect to FIG. 2.

Further, in some examples, the generating the output value (e.g., summarization word) includes extracting or otherwise determining embedding data from words of the obtained communication segment. Embedding data may include at least one of the following: speaking party embeddings, token embeddings, position embeddings, and sentence position embeddings. Then, the extracted embedding data may be provided as input to the GLM, wherein the GLM is configured to generate the output value based on the extracted embedding data as described herein.

At 406, if the generated output value maps to a training bias value in a defined set of training bias values (e.g., training bias words 118), the process proceeds to 408. Alternatively, if the output value does not map to a training bias value, the process proceeds to 410. In some examples, a bias reducer component (e.g., bias reducer 120) obtains each generated summarization word from the GLM and maps or otherwise matches the obtained summarization word to each of the defined training bias words and, upon identifying a mapped or otherwise matching training bias word, the bias reducer may cause the process to proceed to 408.

At 408, an alternative output value is generated, and the process returns to 406, at which point, it is determined whether the alternative output value maps to a training bias value as previously described. In some examples, the bias reducer instructs the GLM to generate the alternative summarization word to replace the previously generated summarization word, such that words that are considered biased are avoided or reduced in the final segment summary. Additionally, or alternatively, the generation of the alternative output value may include the GLM generating an output value based on the potential output value with the next highest assigned factor or weight, or otherwise the next potential output value in a priority order of potential output values.

At 410, the current summarization word is used in a generated segment output (e.g., a segment summary 122) for the communication segment. In some examples, the method 400 includes generating a plurality of summarization words as described with respect to 404-410, such that the resulting segment output includes the plurality of summarization words. Additionally, or alternatively, the generated segment output may be displayed or otherwise provided to a user of an associated system (e.g., via a GUI as described herein).

In some examples, the training bias words to which the generated summarization words are mapped are defined based on at least one of the following: words that occur with high frequency in training data used to train the generative language model, and words that are identified as being domain-specific to a domain of the training data used to train the generative language model. Additionally, or alternatively, the definition of the training bias words may be based on obtaining a set of bias word identification rules, applying the set of bias word identification rules to at least a portion of the training data used to train the generative language model, and based on applying the set of bias word identification rules, determining the set of training bias words from the training data, as described herein.

It should be understood that, while some examples are described that use summarization words, training bias words, and/or segment summaries, in other examples, the described methods and systems may use other output values, training bias values, and/or segment outputs without departing from the description.

Figure 5:
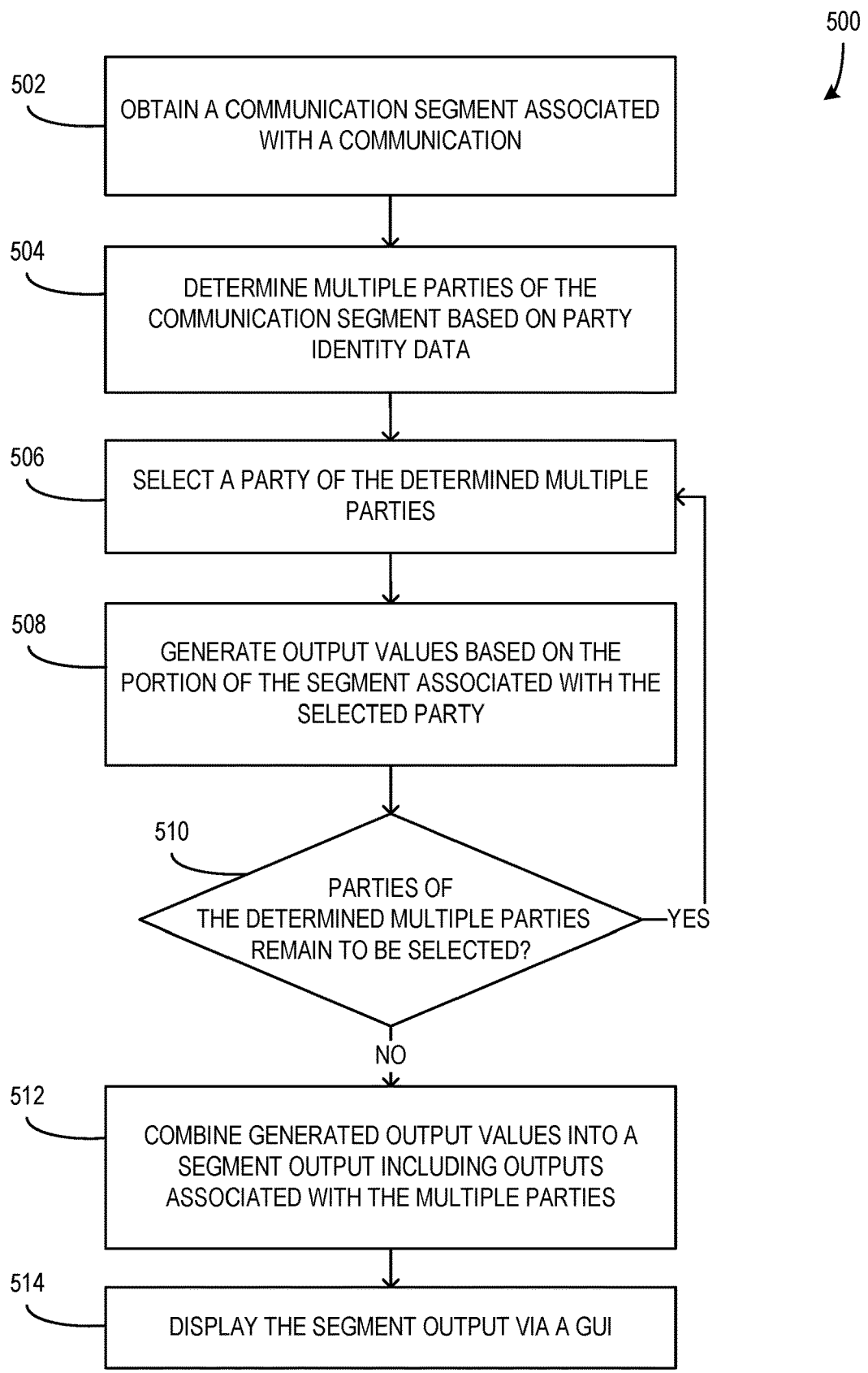
FIG. 5 is a flowchart illustrating a computerized method for generating a segment summary including summaries associated with multiple parties of the communication according to an embodiment.

FIG. 5 is a flowchart illustrating a computerized method 500 for generating a segment output (e.g., segment summaries 122) including outputs associated with multiple parties of the communication according to an embodiment. In some examples, the method 500 is executed or otherwise performed by a system such as system 100 of FIG. 1 and/or components thereof, such as GLM 116. At 502, a communication segment associated with a communication is obtained.

At 504, multiple parties of the communication segment are determined based on party identity data. In some examples, the communication segment includes party identity data from previous processing (e.g., the party identity data may be determined during a speech-to-text conversion of a call recording 104 or other audio data). Alternatively, or additionally, party identity data may be determined from the data of the communication segment prior to proceeding with the method 500. For instance, party identity data may include party labels of each portion of the communication segment (e.g., a conversation between a customer and an agent where each sentence or statement is assigned either a customer label or an agent label).

At 506, a party of the determined multiple parties is selected and, at 508, output values (e.g., summarization words 117) are generated based on a portion or portions of the segment associated with the selected party. In some examples, generation of the output values may be performed as described above with respect to at least method 400, including the bias reduction based on training bias words. As a result of the generation of output values specific to the selected party, partial summary associated with the selected party may be generated (e.g., a summary or other output specific to communication by a customer on in the communication segment).

At 510, if parties of the determined multiple parties remain to be selected, the process returns to 506 to select another party. Alternatively, if no parties remain to be selected, the process proceeds to 512. In some examples, the generation of party-specific output values at 506-510 are performed in series for each party of the multiple parties (e.g., one party at a time). Alternatively, or additionally, one or more instances of the generation of party-specific output values at 506-510 may be performed in parallel without departing from the description.

At 512, the generated party-specific output values are combined into a segment output including outputs associated with the multiple parties. In some examples, at 514, the combined segment output is displayed or otherwise provided to users of an associated system with separate sections associated with each party of the multiple parties (e.g., the sections of the GUI 600 of FIG. 6).

It should be understood that, while some examples are described that use summarization words and/or segment summaries, in other examples, the described methods and systems may use other output values and/or segment outputs without departing from the description.

Figure 6:
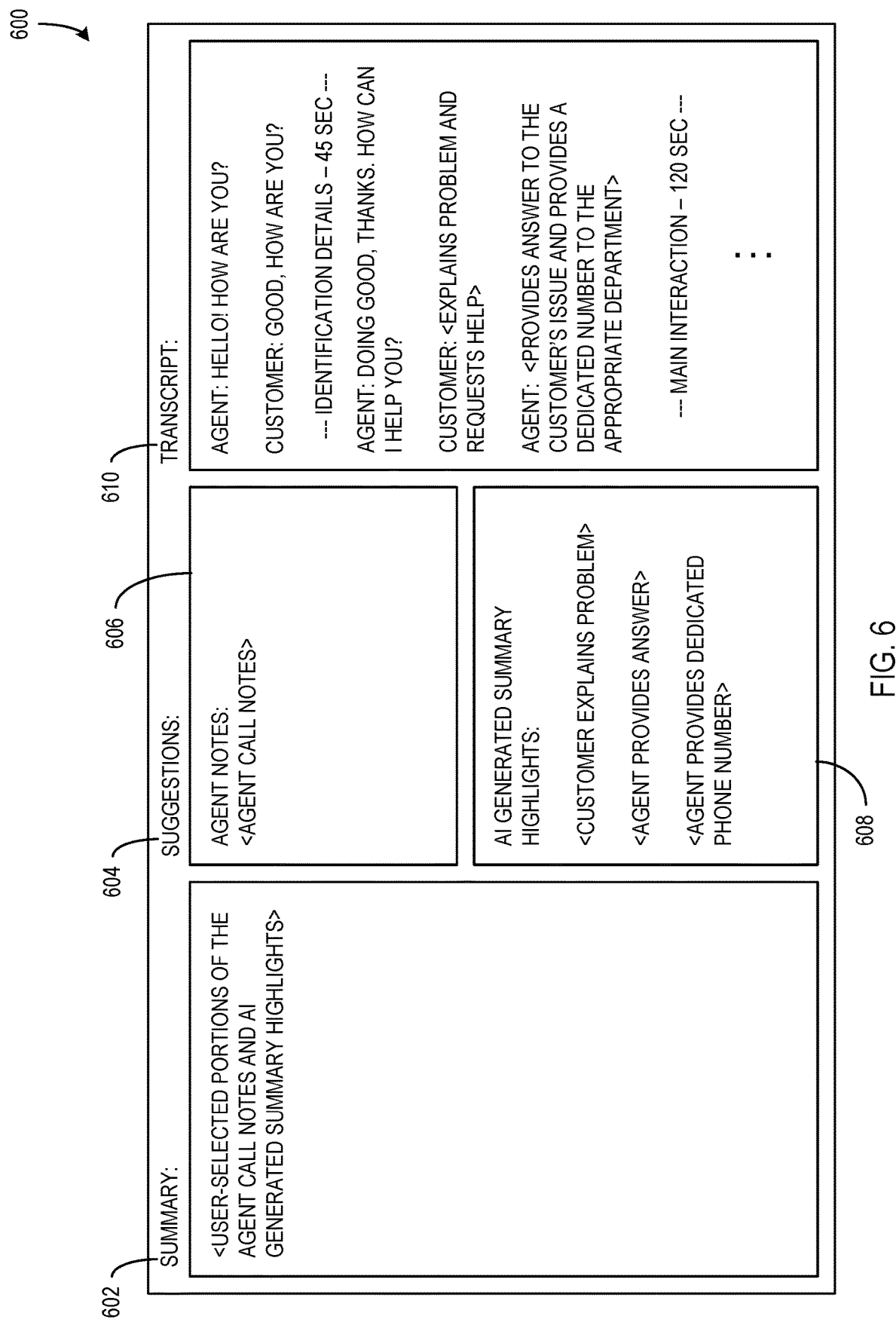
FIG. 6 is a diagram illustrating a graphical user interface (GUI) displaying information about a communication including generated segment summaries according to an embodiment.

FIG. 6 is a diagram illustrating a graphical user interface (GUI) 600 displaying information about a communication including generated segment summaries 608 according to an embodiment. In some examples, the GUI 600 is displayed to a user of a system such as system 100 of FIG. 1. In some examples, the GUI 600 is configured to display information about a communication and to enable a user to review and/or complete a summary of the communication.

The GUI 600 includes a summary section 602, a suggestions section 604, and a transcript section 610. In some examples, the summary section 602 is configured to display the summary of the communication and enable the user to review, edit, or otherwise interact with the displayed summary (e.g., the user may be enabled to type portions of text for the displayed summary). Further, the summary section 602 may be configured to enable the user to select portions of text or data from the suggestions section 604 and move it into the displayed summary (e.g., the user may drag and drop an Artificial Intelligence (AI) generated summary highlight from the section 608 to the section 602).

The suggestions section 604 is configured to display suggested text and/or other data for inclusion into the summary of section 602. In some examples, the suggestion section 604 includes an agent notes section 606 and an AI generated summary highlights section 608. Notes manually taken by the agent of the communication may be displayed in the agent notes section 606 and segment summaries (e.g., segment summaries 122 generated by a GLM 116 as described herein) may be displayed in the AI generated summary highlights section 608. These sections 606 and 608 may be configured to enable a user to select text or other data and to add or otherwise transfer the selected text or other data into the summary of section 602. Further, the user may be enabled to select and remove text in the summary of section 602 in a similar manner (e.g., transferring selected text from the summary of section 602 back to sections 606 and/or 608).

The transcript section 610 is configured to display the transcript of the communication (e.g., a communication transcript 108). Additionally, the transcript section 610 may include other data associated with the text of the transcript, such as labels of the segments of the transcript (e.g., the "identification details" and "main interaction" labels displayed). In other examples, the transcript section 610 may display other aspects of the communication as well.

In some examples, the GUI 600 enables a user to listen to a recording of the communication as well. In such examples, the playing of the recording of the communication may be synchronized with the display of the transcript in the transcript section 610 and/or with the display of associated segment summaries in the AI generated summary highlights section 608. In other examples, the GUI 600 may include other features for observing, reviewing, and/or interacting with the communication transcript and associated summary without departing from the description.

In some examples, the systems and methods for reducing training bias of a GLM may be applied for reducing bias of GLMs that are used for other purposes (e.g., generating recommendations) and/or for reducing bias of other types of models based on the training data thereof. Generally, a model that is trained using a set of training data associated with a domain may be biased toward or against attributes or aspects of that set of training data and/or associated with that domain. If such biases are identified, a set of training bias words or other training bias data points may be defined to reduce or eliminate the chances that the model uses such biases in output when the model is applied to input associated with a different domain. For instance, a text recommendation model (e.g., a GLM trained to provided text recommendations) may be trained on training data that includes a bias toward a particular genre of movie or type of cuisine. Those biases may be identified and included in a set of training bias data, such that recommendation of that genre of movie or type of cuisine to users of the recommendation model is reduced.

Exemplary Operating Environment

Figure 7:
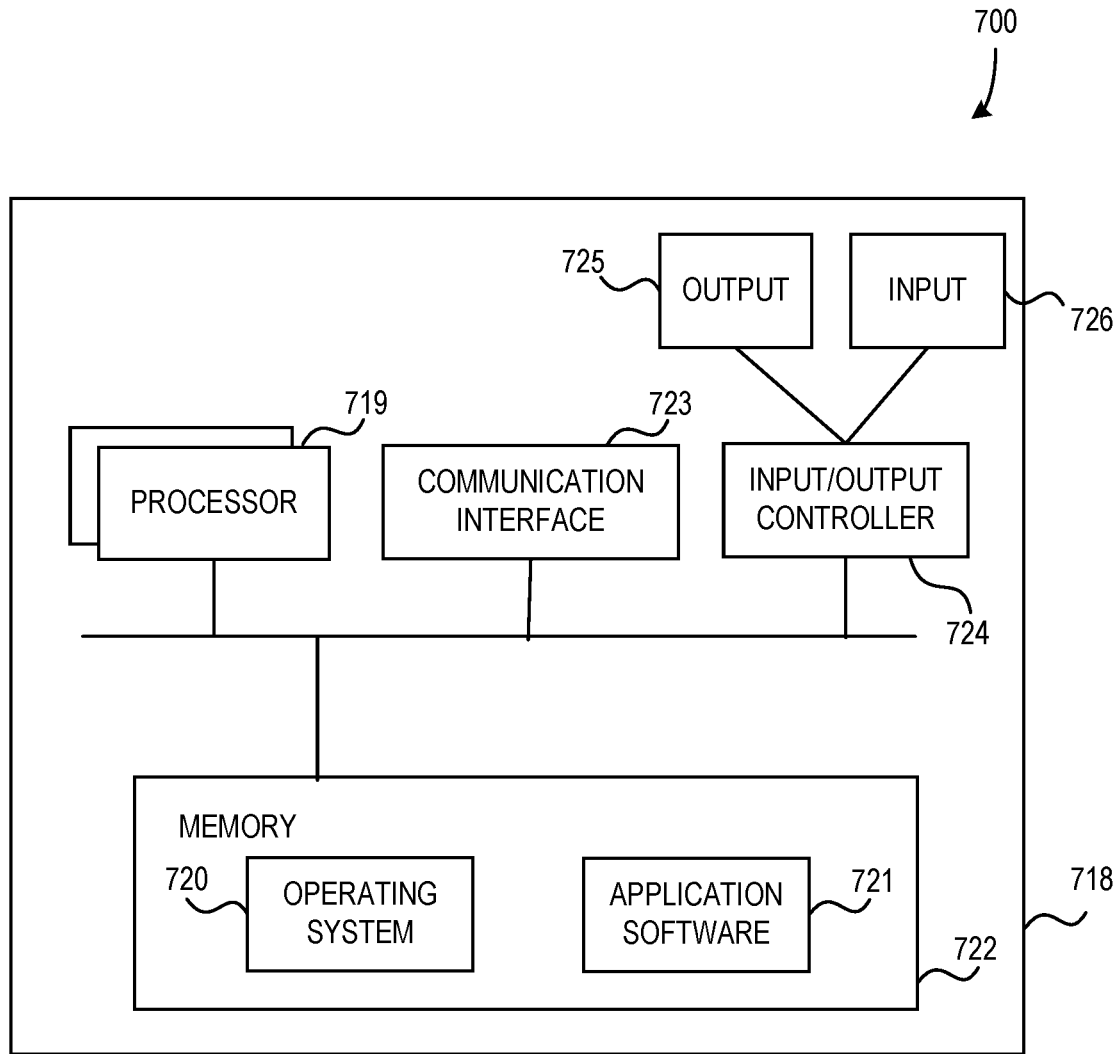
FIG. 7 illustrates a computing apparatus according to an embodiment as a functional block diagram.

The present disclosure is operable with a computing apparatus according to an embodiment as a functional block diagram 700 in FIG. 7. In an embodiment, components of a computing apparatus 718 may be implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. Platform software comprising an operating system 720 or any other suitable platform software may be provided on the apparatus 718 to enable application software 721 to be executed on the device. According to an embodiment, generating summaries of communication transcripts using a generative language model while reducing training bias of the model as described herein may be accomplished by software, hardware, and/or firmware.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g., using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone, or a touchpad. In one embodiment, the output device 725 may also act as the input device. An example of such a device may be a touch sensitive display. The input/output controller 724 may also output data to devices other than the output device, e.g., a locally connected printing device. In some embodiments, a user may provide input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for reducing training bias in summaries generated by a generative language model comprises at least one processor; and at least one memory comprising computer program code, the at least one memory and the computer program code configured to, with the at least one processor, cause the at least one processor to: obtain, by a generative language model implemented on the at least one processor, a communication segment associated with a communication; generate, by the generative language model, a summarization word associated with the communication segment; map the summarization word to a set of training bias words associated with the generative language model; based on the mapping of the summarization word to a training bias word of the set of training bias words, generate an alternative summarization word; and use the alternative summarization word in a generated segment summary for the communication segment.

An example system for reducing training bias in outputs generated by a generative language model comprises: at least one processor; and at least one memory comprising computer program code, the at least one memory and the computer program code configured to, with the at least one processor, cause the at least one processor to: obtain, by a generative language model implemented on the at least one processor, a communication segment associated with a communication; generate, by the generative language model, an output value associated with the communication segment; map the output value to a set of training bias values associated with the generative language model; based on the mapping of the output value to a training bias value of the set of training bias values, generate an alternative output value; and use the alternative output value in a generated segment output for the communication segment.

An example computerized method for reducing training bias in summaries generated by a generative language model comprises: obtaining, by at least one processor of a generative language model, a communication segment associated with a communication; generating, by the at least one processor, a summarization word associated with the communication segment; mapping, by the at least one processor, the summarization word to a set of training bias words associated with the generative language model; based on the mapping of the summarization word to a training bias word of the set of training bias words, generating, by the at least one processor, an alternative summarization word; and using, by the at least one processor, the alternative summarization word in a generated segment summary for the communication segment.

An example computerized method for reducing training bias in outputs generated by a generative language model comprises: obtaining, by at least one processor of a generative language model, a communication segment associated with a communication; generating, by the at least one processor, an output value associated with the communication segment; mapping, by the at least one processor, the output value to a set of training bias values associated with the generative language model; based on the mapping of the output value to a training bias value of the set of training bias values, generating, by the at least one processor, an alternative output value; and using, by the at least one processor, the alternative output value in a generated segment output for the communication segment.

One or more computer storage media having computer-executable instructions for generating summaries based on communication transcripts, upon execution by a processor, causes the processor to at least: obtain, by a generative language model implemented on the processor, a communication segment associated with a communication; generate, by the generative language model, a summarization word associated with the communication segment; map the summarization word to a set of training bias words associated with the generative language model; based on the mapping of the summarization word to a training bias word of the set of training bias words, generate an alternative summarization word; and use the alternative summarization word in a generated segment summary for the communication segment.

One or more computer storage media having computer-executable instructions for reducing training bias in outputs generated by a generative language model that, upon execution by a processor, cause the processor to at least: obtain, by a generative language model implemented on the processor, a communication segment associated with a communication; generate, by the generative language model, a output value associated with the communication segment; map the output value to a set of training bias values associated with the generative language model; based on the mapping of the output value to a training bias value of the set of training bias values, generate an alternative output value; and use the alternative output value in a generated segment output for the communication segment.

Alternatively, or in addition to the other examples described herein, examples include any combination of the following:
  wherein the communication includes communication between a first party and a second party and wherein the communication segment includes party identity data that identifies which party is a source of each portion of the communication segment; and wherein the generative language model generates summarization words associated with the first party and summarization words associated with the second party based on the party identity data.
  further comprising: obtaining audio data associated with the communication; converting the audio data to text data; determining the party identity data for the text data; generating a communication transcript from the text data, wherein the determined party identity data is included in the generated communication transcript; and dividing the communication transcript into multiple communication segments, wherein the multiple communication segments include the communication segment obtained by the generative language model.
  further comprising: displaying the generated segment summary via a graphical user interface (GUI), including displaying, via the GUI, a first segment summary portion including the summarization words associated with the first party and displaying, via the GUI, a second segment summary portion including the summarization words associated with the second party.
  wherein the set of training bias words include at least one of the following: words that occur with high frequency in training data used to train the generative language model, and words that are identified as being domain-specific to a domain of the training data used to train the generative language model.
  further comprising generating the set of training bias words, wherein the generating of the set of training bias words includes: obtaining a set of bias word identification rules; filtering at least a portion of the training data used to train the generative language model using the obtained set of bias word identification rules; and based on the filtering of at least the portion of the training data, generating the set of training bias words from the training data.
  wherein generating, by the at least one processor of the generative language model, a summarization word associated with the communication segment includes: extracting embedding data from words of the obtained communication segment, wherein the extracted embedding data includes at least one of the following: speaking party embeddings, token embeddings, position embeddings, and sentence position embeddings; and providing the extracted embedding data as input to the generative language model, wherein the generative language model is configured to generate the summarization word based on the extracted embedding data.
  wherein the communication includes communication between a first party and a second party and wherein the communication segment includes party identity data that identifies which party is a source of each portion of the communication segment; and wherein the generative language model generates output values including summarization words associated with the first party and summarization words associated with the second party based on the party identity data.
  further comprising: obtaining audio data associated with the communication; converting the audio data to text data; determining the party identity data for the text data; generating a communication transcript from the text data, wherein the determined party identity data is included in the generated communication transcript; and dividing the communication transcript into multiple communication segments, wherein the multiple communication segments include the communication segment obtained by the generative language model.
  further comprising: displaying the generated segment output via a graphical user interface (GUI), including displaying, via the GUI, a first segment summary portion including the summarization words associated with the first party and displaying, via the GUI, a second segment summary portion including the summarization words associated with the second party.
  wherein the set of training bias values include at least one of the following: words that occur with high frequency in training data used to train the generative language model, and words that are identified as being domain-specific to a domain of the training data used to train the generative language model.
  further comprising generating the set of training bias words, wherein the generating of the set of training bias words includes: obtaining a set of bias value identification rules; filtering at least a portion of the training data used to train the generative language model using the obtained set of bias value identification rules; and based on the filtering of at least the portion of the training data, generating the set of training bias values from the training data.
  wherein generating, by the at least one processor of the generative language model, a output value associated with the communication segment includes: extracting embedding data from words of the obtained communication segment, wherein the extracted embedding data includes at least one of the following: speaking party embeddings, token embeddings, position embeddings, and sentence position embeddings; and providing the extracted embedding data as input to the generative language model, wherein the generative language model is configured to generate the output value based on the extracted embedding data.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining, by at least one processor of a generative language model, a communication segment associated with a communication; exemplary means for generating, by the at least one processor, a summarization word associated with the communication segment; exemplary means for mapping, by the at least one processor, the summarization word to a set of training bias words associated with the generative language model; based on the mapping of the summarization word to a training bias word of the set of training bias words, exemplary means for generating, by the at least one processor, an alternative summarization word; and exemplary means for using, by the at least one processor, the alternative summarization word in a generated segment summary for the communication segment.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for reducing training bias in outputs generated by a generative language model, the system comprising:
   at least one processor; and
   at least one memory comprising computer program code, the at least one memory and the computer program code configured to, with the at least one processor, cause the at least one processor to:
   divide a communication into a plurality of communication segments, wherein each communication segment of the plurality of communication segments comprises one or more sentences associated with a single topic;
   obtain, by the generative language model implemented on the at least one processor, a communication segment of the plurality of communication segments;
   generate, by the generative language model, a branching tree of summarization words associated with the communication segment, the branching tree comprising a plurality of branching paths;
   map a summarization word of the branching tree to a set of training bias words associated with the generative language model, wherein the set of training bias words are words that are selected from training data of the generative language model;
   based on the summarization word matching a training bias word of the set of training bias words, generate an alternative summarization word, wherein generating the alternative summarization word comprises selecting an alternative path of the plurality of branching paths; and
   use the alternative summarization word in a generated segment output for the communication segment.

2. The system of claim 1, wherein the communication includes communication between a first party and a second party and wherein the communication segment includes party identity data that identifies which party is a source of each portion of the communication segment; and
   wherein the generative language model generates output values including summarization words associated with the first party and summarization words associated with the second party based on the party identity data.

3. The system of claim 2, wherein the computer program code is configured to, with the at least one processor, further cause the at least one processor to:

display the generated segment output via a graphical user interface (GUI), including displaying, via the GUI, a first segment summary portion including the summarization words associated with the first party and displaying, via the GUI, a second segment summary portion including the summarization words associated with the second party.

4. The system of claim 1, wherein dividing the communication into the plurality of communication segments comprises:
identifying a plurality of sentences in the communication;
vectorizing the plurality of sentences into a plurality of sentence vectors;
splitting the plurality of sentence vectors into a plurality of groups based on similarity, wherein all sentences in each group of the plurality of groups are related to a particular topic; and
generating the plurality of communication segments based on the plurality of groups.

5. The system of claim 1, wherein selecting the alternative path of the plurality of branching paths comprises:
assigning, by the generative language model, weights to next possible words in the branching tree;
analyzing, by the generative language model, previously generated summarization words in the generated segment output; and
selecting, by the generative language model, a branching path with a second highest assigned weight as the alternative path.

6. The system of claim 1, wherein the computer program code is configured to, with the at least one processor, further cause the at least one processor to:
obtain a set of bias value identification rules;
filter at least a portion of the training data used to train the generative language model using the obtained set of bias value identification rules; and
based on the filtering of at least the portion of the training data, generate the set of training bias words from the training data.

7. The system of claim 1, wherein generating, by the generative language model, a summarization word associated with the communication segment includes:
extracting speaker embeddings from words of the obtained communication segment;
mapping the speaker embeddings to role vectors; and
generating the summarization word based on the speaker embeddings and role vectors.

8. A computerized method for reducing training bias in outputs generated by a generative language model, the computerized method comprising:
dividing a communication into a plurality of communication segments, wherein each communication segment of the plurality of communication segments comprises one or more sentences associated with a single topic;
obtaining, by at least one processor of the generative language model, a communication segment of the plurality of communication segments;
generating, by the at least one processor, a branching tree of summarization words associated with the communication segment, the branching tree comprising a plurality of branching paths;
mapping, by the at least one processor, a summarization word of the branching tree to a set of training bias words associated with the generative language model, wherein the set of training bias words are words that are selected from training data of the generative language model;
based on the summarization word matching a training bias word of the set of training bias words, generating, by the at least one processor, an alternative summarization word, wherein generating the alternative summarization word comprises selecting an alternative path of the plurality of branching paths; and
using, by the at least one processor, the alternative summarization word in a generated segment output for the communication segment.

9. The computerized method of claim 8, wherein the communication includes communication between a first party and a second party and wherein the communication segment includes party identity data that identifies which party is a source of each portion of the communication segment; and
wherein the generative language model generates output values including summarization words associated with the first party and summarization words associated with the second party based on the party identity data.

10. The computerized method of claim 9, further comprising:
displaying the generated segment output via a graphical user interface (GUI), including displaying, via the GUI, a first segment summary portion including the summarization words associated with the first party and displaying, via the GUI, a second segment summary portion including the summarization words associated with the second party.

11. The computerized method of claim 8, wherein dividing the communication into the plurality of communication segments comprises:
identifying a plurality of sentences in the communication;
vectorizing the plurality of sentences into a plurality of sentence vectors;
splitting the plurality of sentence vectors into a plurality of groups based on similarity, wherein all sentences in each group of the plurality of groups are related to a particular topic; and
generating the plurality of communication segments based on the plurality of groups.

12. The computerized method of claim 8, wherein selecting the alternative path of the plurality of branching paths comprises:
assigning, by the generative language model, weights to next possible words in the branching tree;
analyzing, by the generative language model, previously generated summarization words in the generated segment output; and
selecting, by the generative language model, a branching path with a second highest assigned weight as the alternative path.

13. The computerized method of claim 8, further comprising generating the set of training bias words, wherein the generating of the set of training bias words includes:
obtaining a set of bias value identification rules;
filtering at least a portion of the training data used to train the generative language model using the obtained set of bias value identification rules; and
based on the filtering of at least the portion of the training data, generating the set of training bias words from the training data.

14. The computerized method of claim 8, wherein generating, by the at least one processor of the generative language model, a summarization word associated with the communication segment includes:
  extracting speaker embeddings;
  mapping the speaker embeddings to role vectors; and
  generating the summarization word based on the speaker embeddings and the role vectors.

15. One or more computer storage media having computer-executable instructions for reducing training bias in outputs generated by a generative language model that, upon execution by a processor, cause the processor to at least:
  divide a communication into a plurality of communication segments, wherein each communication segment of the plurality of communication segments comprises one or more sentences associated with a single topic;
  obtain, by the generative language model implemented on the processor, a communication segment of the plurality of communication segments;
  generate, by the generative language model, a branching tree of summarization words associated with the communication segment, the branching tree comprising a plurality of branching paths;
  map a summarization word of the branching tree to a set of training bias words associated with the generative language model, wherein the set of training bias words are words that are selected from training data of the generative language model;
  based on the summarization word matching a training bias word of the set of training bias words, generate an alternative summarization word, wherein generating the alternative summarization word comprises selecting an alternative path of the plurality of branching paths; and
  use the alternative summarization word in a generated segment output for the communication segment.

16. The one or more computer storage media of claim 15, wherein the communication includes communication between a first party and a second party and wherein the communication segment includes party identity data that identifies which party is a source of each portion of the communication segment; and
  wherein the generative language model generates output values including summarization words associated with the first party and summarization words associated with the second party based on the party identity data.

17. The one or more computer storage media of claim 16, wherein computer-executable instructions, upon execution by a processor, further cause the processor to at least:
  display the generated segment output via a graphical user interface (GUI), including displaying, via the GUI, a first segment summary portion including the summarization words associated with the first party and displaying, via the GUI, a second segment summary portion including the summarization words associated with the second party.

18. The one or more computer storage media of claim 15, wherein dividing the communication into the plurality of communication segments comprises:
  identifying a plurality of sentences in the communication;
  vectorizing the plurality of sentences into a plurality of sentence vectors;
  determining a plurality of groups from the plurality of sentence vectors based on similarity, wherein each group of the plurality of groups is associated with a different topic; and generating the plurality of communication segments based on the plurality of groups.

19. The one or more computer storage media of claim 15, wherein the set of training bias words comprises words that occur with high frequency in training data used to train the generative language model, and words that are identified as being domain-specific to a domain of the training data used to train the generative language model.

20. The one or more computer storage media of claim 19, wherein computer-executable instructions, upon execution by a processor, further cause the processor to at least:
  obtain a set of bias value identification rules;
  filter at least a portion of the training data used to train the generative language model using the set of bias value identification rules; and
  based on the filtering of at least the portion of the training data, generate the set of training bias words from the training data.

* * * * *